United States Patent
Wong et al.

(10) Patent No.: US 7,613,887 B1
(45) Date of Patent: Nov. 3, 2009

(54) SYSTEM AND METHOD FOR MANAGING A MEMORY STORAGE DEVICE

(75) Inventors: William C. Wong, Cerritos, CA (US); Kha Nguyen, Anaheim, CA (US); Huy Tu Nguyen, Laguna Hills, CA (US)

(73) Assignee: Marvell International Ltd., Hamilton (BM)

( * ) Notice: Subject to any disclaimer, the term of this patent is extended or adjusted under 35 U.S.C. 154(b) by 586 days.

(21) Appl. No.: 11/522,726

(22) Filed: Sep. 18, 2006

(51) Int. Cl.
*G06F 12/00* (2006.01)
(52) U.S. Cl. .................. 711/154; 711/117; 710/52
(58) Field of Classification Search ............... None
See application file for complete search history.

(56) References Cited

U.S. PATENT DOCUMENTS

| | | | | |
|---|---|---|---|---|
| 5,007,051 A | * | 4/1991 | Dolkas et al. | 370/235 |
| 6,098,125 A | * | 8/2000 | Fiacco et al. | 710/52 |
| 6,374,314 B1 | * | 4/2002 | Darnell et al. | 710/52 |
| 6,622,183 B1 | * | 9/2003 | Holm | 710/34 |
| 7,320,041 B2 | * | 1/2008 | Biran et al. | 710/29 |

* cited by examiner

*Primary Examiner*—Hiep T Nguyen

(57) ABSTRACT

A memory management system for a memory in a data storage device comprises a memory controller module that receives a frame of data including a plurality of data words from a host, that generates boundary indicators based on at least one of a start and an end of the frame and the plurality of data words, and that inserts the boundary indicators into the frame of data and a memory that receives the frame of data and stores the frame of data including the data words and the boundary indicators during transmission between the host and the storage device.

45 Claims, 9 Drawing Sheets

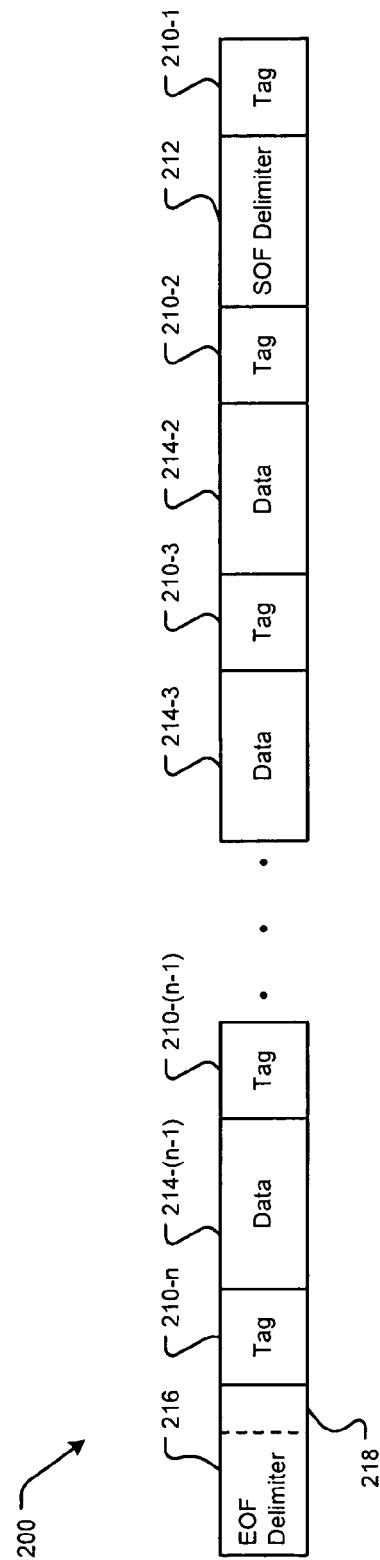
FIG. 4A
(PRIOR ART)
FIG. 4B

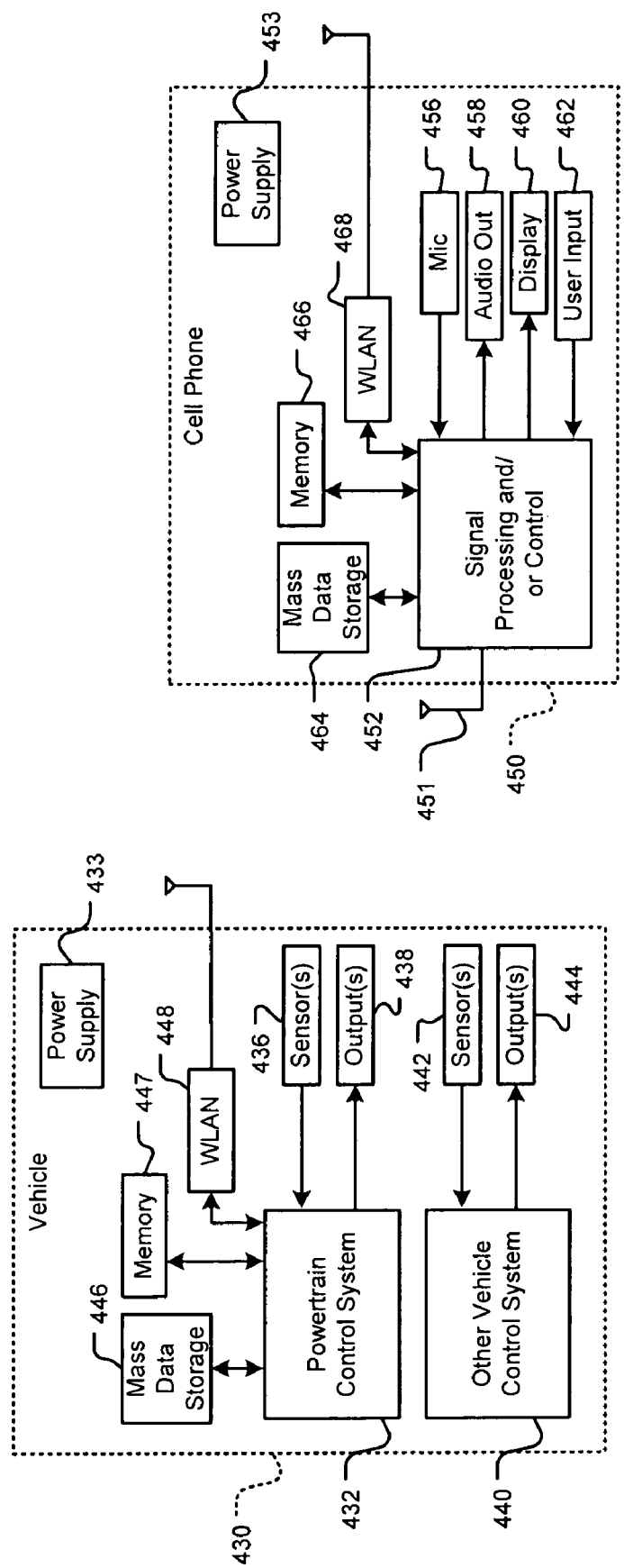

SYSTEM AND METHOD FOR MANAGING A MEMORY STORAGE DEVICE

FIELD

The present disclosure generally relates to storage device controllers, and more particularly to efficiently managing data flow.

BACKGROUND

Host devices such as computers, laptops, personal video recorders (PVRs), MP3 players, game consoles, servers, set-top boxes, digital cameras, and/or other electronic devices often need to store a large amount of data. Storage devices such as hard disk drives (HDDs) may be used to meet these storage requirements.

A controller communicates with the storage device and the host system. The controller manages interaction between the storage device and the host system. Communication between the host system and the controller is usually provided using one of a variety of standard I/O bus interfaces. Typically, when data is read from a storage device, a host system sends a read command to the controller, which stores the read command into a buffer memory. Data is read from the storage device and stored in a buffer memory.

Conventional controllers use a first-in-first-out ("FIFO") staging memory for temporarily holding data before data is sent to its proper location. In conventional FIFO implementations, FIFO storage capacity is limited by the size of an address table. An address table identifies the type of data being stored to a FIFO. FIFOs generally consist of a set of read and write pointers and storage and control logic. Referring now to FIG. 1, an exemplary FIFO 10 is shown to include a memory 12 coupled to a write logic 14 and a read logic 16. The memory 12 receives a write enable signal 18. When the write enable signal 18 is asserted, data (not shown), supplied by a write data signal 20, is written to a write address (not shown) in the memory 12. A write address signal 28 provides the write address. Write logic 14 outputs a full signal 22 to a control module (not shown) of the FIFO 10.

The memory 12 receives a read enable signal 24 and outputs data 30 to a first register (not shown). Read logic 16 outputs a read data valid signal 26 to a second register (not shown). The read enable signal 24 requests a read from the FIFO 10, and the read data valid signal 26 serves to denote that new data is accessible on the data bus (not shown) on the following clock cycle. A read address signal 32 indicates the read address to be accessed.

SUMMARY

A memory management system for a memory in a data storage device comprises a memory controller module that receives a frame of data including a plurality of data words from a host, that generates boundary indicators based on at least one of a start and an end of the frame and the plurality of data words, and that inserts the boundary indicators into the frame of data and a memory that receives the frame of data and stores the frame of data including the data words and the boundary indicators during transmission between the host and the storage device.

In other features, the boundary indicators include a first boundary indicator that indicates a type of data of the plurality of data words and the type of data includes at least one of user data, command data, and link data. The boundary indicators include a second boundary indicator that includes at least one of a frame cyclic redundancy code (CRC), a number of sectors included within the frame, and a position of the frame within a plurality of frames of a data transfer. The memory controller module includes a validity indicator in the secondary boundary indicator based on a last data word of the plurality of data words.

An insertion module generates at least one of a plurality of preliminary tags for at least one of each of the plurality of data words and the boundary indicators based on the data words. The preliminary tags indicate at least one of a type of data of the data words, errors within the frame of data, locations for each of the plurality of data words within the frame of data, and completion of a sector. The memory controller module calculates the frame CRC when the plurality of data words are transmitted from the insertion module to the memory controller module.

In other features, the memory controller module generates a plurality of tags that identify at least one of each of the plurality of data words and the boundary indicators based on the preliminary tags and stores the tags to the memory. The memory controller module detects a first preliminary tag that indicates the start of the frame, halts the insertion module from generating the plurality of preliminary tags when the memory controller module detects the first preliminary tag, stores a first tag that corresponds to the first boundary indicator, and directs the insertion module to resume operation. The memory controller module detects a second preliminary tag that indicates the end of the frame, halts the insertion module when the memory controller module detects the second preliminary tag, stores a second tag that corresponds to the second boundary indicator, and directs the insertion module to resume operation.

In other features, the management system further comprises an output module that communicates with the memory, that detects the boundary indicators and the tags, that processes the frame of data based on the boundary indicators and the tags, and that transmits the frame of data to a second memory based on at least one of the boundary indicators and the tags. The output module calculates a generated CRC and determines that an error has occurred when the generated CRC differs from the frame CRC. The output module removes the tags from the frame of data.

In other features the memory is a first-in-first-out (FIFO) memory. A hard disk drive controller includes the management system.

A memory management system for a memory in a data storage device comprises memory controller means for receiving a frame of data including a plurality of data words from a host, for generating boundary indicators based on at least one of a start and an end of the frame and the plurality of data words, and for inserting the boundary indicators into the frame of data and memory means for receiving the frame of data and storing the frame of data including the data words and the boundary indicators during transmission between the host and the storage device.

In other features, the boundary indicators include a first boundary indicator that indicates a type of data of the plurality of data words and the type of data includes at least one of user data, command data, and link data. The boundary indicators include a second boundary indicator that includes at least one of a frame cyclic redundancy code (CRC), a number of sectors included within the frame, and a position of the frame within a plurality of frames of a data transfer. The memory controller means includes a validity indicator in the secondary boundary indicator based on a last data word of the plurality of data words.

In other features, the management system further comprises insertion means for generating at least one of a plurality of preliminary tags for at least one of each of the plurality of data words and the boundary indicators based on the data words. The preliminary tags indicate at least one of a type of data of the data words, errors within the frame of data, locations for each of the plurality of data words within the frame of data, and completion of a sector. The memory controller means calculates the frame CRC when the plurality of data words are transmitted from the insertion means to the memory controller means.

In other features, the memory controller means generates a plurality of tags that identify at least one of each of the plurality of data words and the boundary indicators based on the preliminary tags and stores the tags to the memory means. The memory controller means detects a first preliminary tag that indicates the start of the frame, halts the insertion means from generating the plurality of preliminary tags when the memory controller means detects the first preliminary tag, stores a first tag that corresponds to the first boundary indicator, and directs the insertion means to resume operation. The memory controller means detects a second preliminary tag that indicates the end of the frame, halts the insertion means when the memory controller means detects the second preliminary tag, stores a second tag that corresponds to the second boundary indicator, and directs the insertion means to resume operation.

In other features, the management system further comprises output means for communicating with the memory means, for detecting the boundary indicators and the tags, for processing the frame of data based on the boundary indicators and the tags, and for transmitting the frame of data to a second memory based on at least one of the boundary indicators and the tags. The output means calculates a generated CRC and determines that an error has occurred when the generated CRC differs from the frame CRC. The output means removes the tags from the frame of data.

In other features, the memory means is a first-in-first-out (FIFO) memory. A hard disk drive controller includes the memory management system.

A memory management method for a memory in a data storage device comprises receiving a frame of data including a plurality of data words from a host, generating boundary indicators based on at least one of a start and an end of the frame and the plurality of data words, and inserting the boundary indicators into the frame of data and receiving the frame of data and storing the frame of data including the data words and the boundary indicators during transmission between the host and the storage device.

In other features, the boundary indicators include a first boundary indicator that indicates a type of data of the plurality of data words and the type of data includes at least one of user data, command data, and link data. The boundary indicators include a second boundary indicator that includes at least one of a frame cyclic redundancy code (CRC), a number of sectors included within the frame, and a position of the frame within a plurality of frames of a data transfer. The secondary boundary indicator includes a validity indicator based on a last data word of the plurality of data words.

In other features, the method further comprises generating at least one of a plurality of preliminary tags for at least one of each of the plurality of data words and the boundary indicators based on the data words. The preliminary tags indicate at least one of a type of data of the data words, errors within the frame of data, locations for each of the plurality of data words within the frame of data, and completion of a sector. The method further comprises calculating the frame CRC after the generation of the plurality preliminary tags.

In other features, the method further comprises generating a plurality of tags that identify at least one of each of the plurality of data words and the boundary indicators based on the preliminary tags and storing the tags to the memory. The method further comprises detecting a first preliminary tag that indicates the start of the frame, halting the generation of the plurality of preliminary tags upon detecting the first preliminary tag, storing a first tag that corresponds to the first boundary indicator, and resuming the generation of the plurality of preliminary tags. The method further comprises detecting a second preliminary tag that indicates the end of the frame, halting the generation of the plurality of preliminary tags upon detecting the second preliminary tag, storing a second tag that corresponds to the second boundary indicator, and resuming the generation of the plurality of preliminary tags.

In other features, the method further comprises communicating with the memory, detecting the boundary indicators and the tags, processing the frame of data based on the boundary indicators and the tags, and transmitting the frame of data to a second memory based on at least one of the boundary indicators and the tags. The method further comprises calculating a generated CRC and determining that an error has occurred when the generated CRC differs from the frame CRC. The method further comprises removing the tags from the frame of data.

In other features, the memory is a first-in-first-out (FIFO) memory. A hard disk drive controller includes the method.

A computer program stored for use by a processor for operating a data management system in a storage device comprises receiving a frame of data including a plurality of data words from a host, generating boundary indicators based on at least one of a start and an end of the frame and the plurality of data words, and inserting the boundary indicators into the frame of data and receiving the frame of data and storing the frame of data including the data words and the boundary indicators during transmission between the host and the storage device.

In other features, the boundary indicators include a first boundary indicator that indicates a type of data of the plurality of data words and the type of data includes at least one of user data, command data, and link data. The boundary indicators include a second boundary indicator that includes at least one of a frame cyclic redundancy code (CRC), a number of sectors included within the frame, and a position of the frame within a plurality of frames of a data transfer. The secondary boundary indicator includes a validity indicator based on a last data word of the plurality of data words.

In other features, the program further comprises generating at least one of a plurality of preliminary tags for at least one of each of the plurality of data words and the boundary indicators based on the data words. The preliminary tags indicate at least one of a type of data of the data words, errors within the frame of data, locations for each of the plurality of data words within the frame of data, and completion of a sector. The program further comprises calculating the frame CRC after the generation of the plurality preliminary tags.

In other features, the program further comprises generating a plurality of tags that identify at least one of each of the plurality of data words and the boundary indicators based on the preliminary tags and storing the tags to the memory. The program further comprises detecting a first preliminary tag that indicates the start of the frame, halting the generation of the plurality of preliminary tags upon detecting the first preliminary tag, storing a first tag that corresponds to the first boundary indicator, and resuming the generation of the plurality of preliminary tags. The method further comprises detecting a second preliminary tag that indicates the end of the frame, halting the generation of the plurality of preliminary tags upon detecting the second preliminary tag, storing a second tag that corresponds to the second boundary indicator, and resuming the generation of the plurality of preliminary tags.

In other features, the program further comprises communicating with the memory, detecting the boundary indicators and the tags, processing the frame of data based on the boundary indicators and the tags, and transmitting the frame of data to a second memory based on at least one of the boundary indicators and the tags. The program further comprises calculating a generated CRC and determining that an error has occurred when the generated CRC differs from the frame CRC. The program further comprises removing the tags from the frame of data.

In other features, the memory is a first-in-first-out (FIFO) memory. A hard disk drive controller includes the program.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A illustrates a frame of information according to the prior art;

FIG. 4B illustrates a frame of information according to the present invention;

FIG. 7C is a functional block diagram of a vehicle control system;

FIG. 7D is a functional block diagram of a cellular phone;

DETAILED DESCRIPTION

Figure 1:
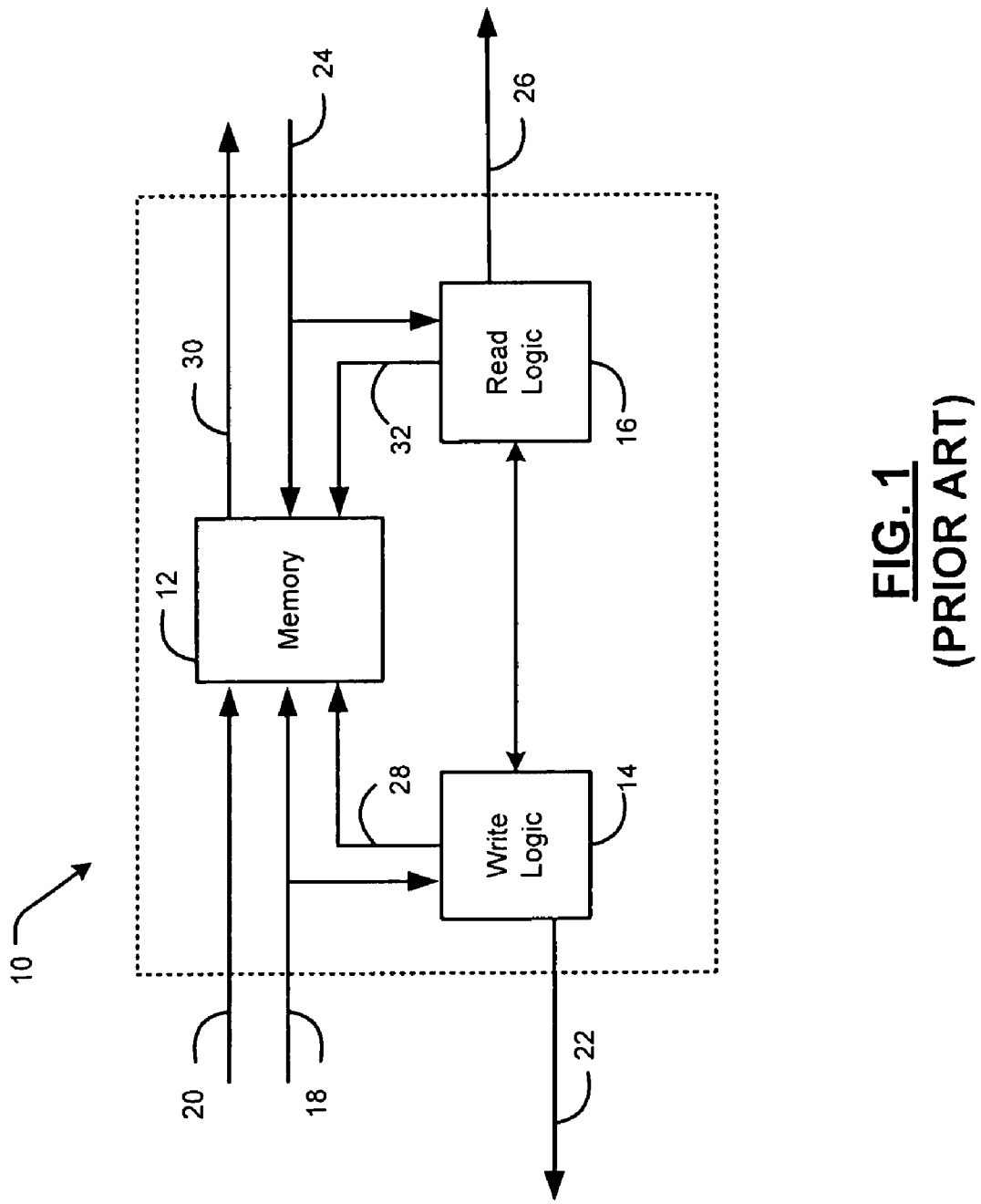
FIG. 1 is a functional block diagram of a first-in-first-out (FIFO) memory device according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Generally, the capacity of an address table is substantially less than that of a FIFO, resulting in the storage capacity of a FIFO not being used efficiently. Communications errors can arise between an address table and a FIFO during the processing of information from a host. In the present implementation, a FIFO management system eliminates the necessity of including an address table.

Figure 2:
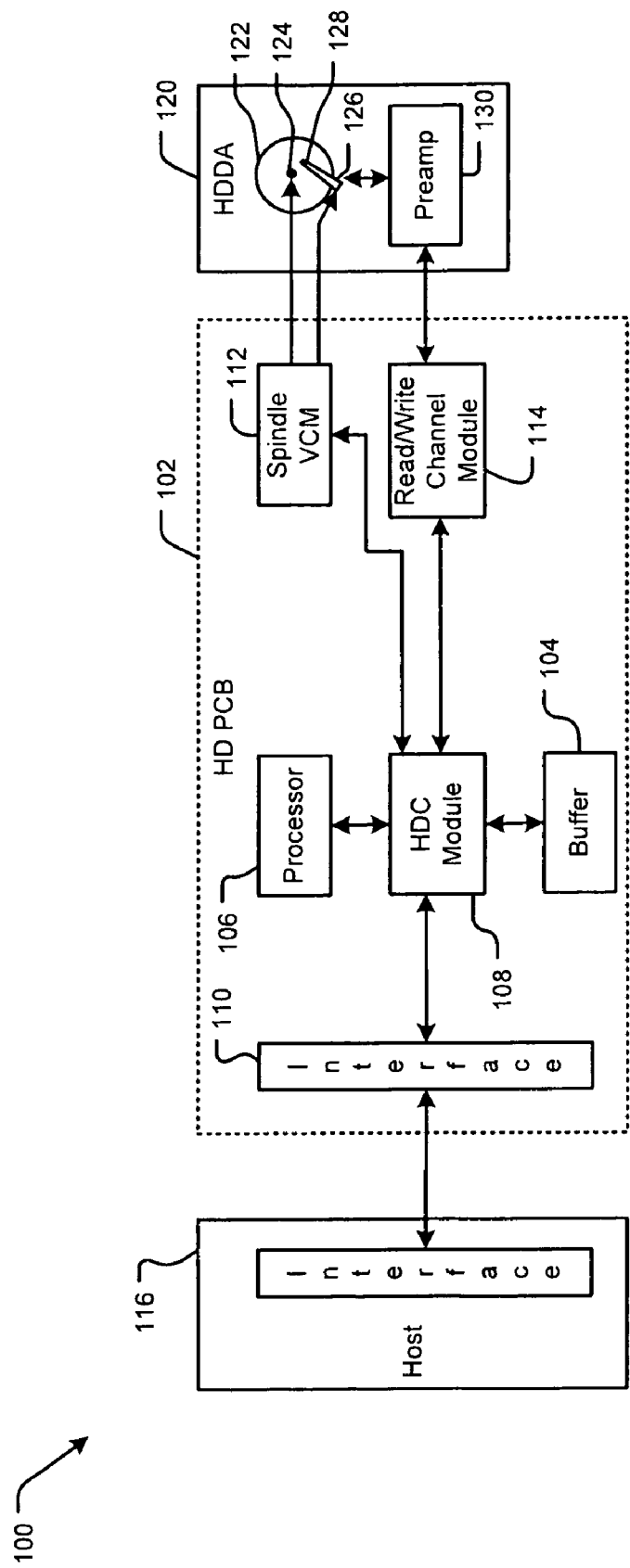
FIG. 2 is a functional block diagram of a hard disk drive (HDD) system according to the present invention.

Referring now to FIG. 2, an exemplary hard disk drive (HDD) system 100 that implements the memory management system (e.g. a FIFO management system) of the present disclosure is shown to include a HDD printed circuit board (PCB) 102. A memory module such as buffer 104 stores read, write and/or volatile control data that is associated with the control of the HDD system 100. The buffer 104 usually employs volatile memory having low latency. For example, SDRAM, double data rate (DDR), or other types of low latency memory may be used. Nonvolatile memory such as flash memory may also be provided to store critical data such as nonvolatile control code.

A processor 106 arranged on the HDD PCB 102 performs data and/or control processing that is related to the operation of the HDD system 100. A hard disk control (HDC) module 108 communicates with an input/output interface 110, with a spindle/voice coil motor (VCM) driver or module 112, and/or a read/write channel module 114. In the present implementation, the HDC module 108 implements the FIFO management system of the present invention. The HDC module 108 coordinates control of the spindle/VCM module 112, the read/write channel module 114, and the processor 106 and data input/output with a host 116 via the interface 110.

A hard disk drive assembly (HDDA) 120 includes one or more hard drive platters 122 that include magnetic coatings that store magnetic fields. The platters 122 are rotated by a spindle motor that is schematically shown at 124. Generally the spindle motor 124 rotates the hard drive platter 122 at a controlled speed during the read/write operations. One or more read/write arms 126 move relative to the platters 122 to read and/or write data to/from the hard drive platters 122. The spindle/VCM module 112 controls the spindle motor 124, which rotates the platters 122. The spindle/VCM module 112 also generates control signals that position the read/write arm 126, for example using a voice coil actuator, a stepper motor or any other suitable actuator.

During write operations, the read/write channel module 114 encodes the data to be written with a read/write device 128. The read/write channel module 114 processes the write signal for reliability and may apply, for example, error correction coding (ECC), run length limited coding (RLL), and the like. During read operations, the read/write channel module 114 converts an analog read signal output of the read/write device 128 to a digital read signal. The converted signal is then detected and decoded by known techniques to recover the data that was written on the platters 122.

The read/write device 128 is located near a distal end of the read/write arm 126. The read/write device 128 includes a write element such as an inductor that generates a magnetic field. The read/write device 128 also includes a read element (such as a magneto-resistive (MR) element) that senses the magnetic field on the platters 122. The HDDA 120 includes a preamplifier circuit or module 130 that amplifies the analog read/write signals. When reading data, the preamplifier module 130 amplifies low level signals from the read element and outputs the amplified signal to the read/write channel module 114. While writing data, a write current is generated that flows through the write element of the read/write device 128. The write current is switched to produce a magnetic field having a positive or negative polarity. The positive or negative polarity is stored by the hard drive platters 122 and is used to represent data.

The data is stored on the platters 122 in sectors. Each sector is byte structured and includes various fields according to a sector format. Typically, a sector format includes a logical block address (LBA) field followed by a data field, a cyclic redundancy check (CRC) checksum field, and/or an ECC field. For example, the LBA field may include 4 bytes data, the data field may include 512 bytes of data, the CRC checksum field may include 4 bytes of data, and the ECC field may include 40-80 bytes of data. The LBA includes position information such as cylinder, head, and/or sector numbers.

Portions of the HDD system 100 may be implemented by one or more integrated circuits (IC) or chips. For example, the processor 106 and the HDC module 108 may be implemented by a single chip. The spindle/VCM module 112 and/or the read/write channel module 114 may also be implemented by the same chip as the processor 106, the HDC module 108 and/or by additional chips. Alternatively, most of the HDD system 100 other than the HDDA 120 may be implemented as a system on chip (SOC).

Figure 3:
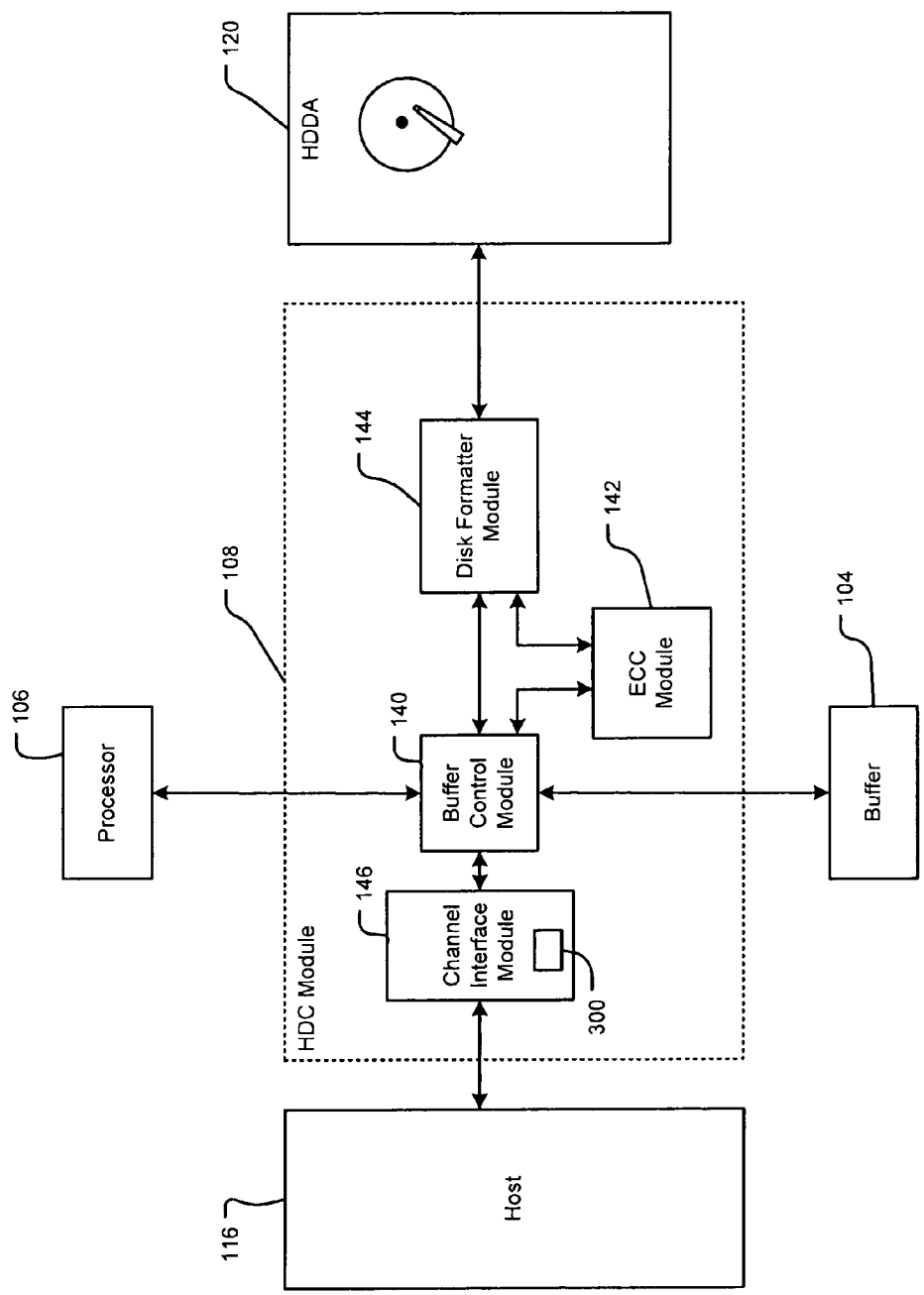
FIG. 3 is a functional block diagram of a hard disk control (HDC) module according to the present invention.

Referring now to FIG. 3, the HDC module 108 is shown in more detail. The HDC module 108 may implement the FIFO management system of the present invention. The HDC module 108 communicates with the buffer 104, the processor 106, the host 116, and the HDDA 120 as described in FIG. 1. The HDC module 108 includes a buffer control module 140, an ECC module 142, a disk formatter module 144, and a channel interface module 146.

The buffer control module 140 (e.g. a direct memory access (DMA) controller) connects the buffer 104 to the disk formatter module 144, the ECC module 142, the host 116, the processor 106, and the HDDA 120. The buffer control module 140 regulates data movement in and out of the buffer 104.

The channel interface module 146 communicates with the interface 110, depicted in FIG. 2, and the buffer control module 140. The channel interface module 146 interfaces between the buffer 104 and the interface 110. The interface module 110 processes any frame-based information including, but not limited to, Serial Attached Small (SAS) Computer Interface frames and fiber channel frames received from the host 116. The frames that the interface module 110 receives are sent to the channel interface module 146.

The channel interface module 146 may implement the FIFO management system by including a FIFO management module 300. The FIFO management module 300 controls data, information, and/or commands communicated between the host 116 and the buffer 104. In various embodiments, the FIFO management module 300 may be implemented by the same integrated circuit as the channel interface module 146 and/or by additional integrated circuits. For example, the buffer control module 140 may include the channel interface module 146 and the FIFO management module 300. Alternatively, the FIFO management module 300 may be implemented as a SOC.

The host 116 transmits read and write commands to the HDC module 108. The HDC module 108 stores the read and write commands in the buffer 104. The processor 106 receives the read and write commands from the buffer 104 and executes firmware to control the HDC module 108 accordingly. During read operations, the HDC module 108 reads data corresponding to the read commands from the HDDA 120. The buffer control module 140 and the ECC module 142 receive the data from the HDDA 120. The ECC module 142 provides an ECC mask for errors that may have occurred during read operations while the data is still in the buffer control module 140. After any errors in the data are corrected, the data is transferred to the buffer 104. The data is then transferred from the buffer 104 to the host 116.

During write operations, the disk formatter module 144 controls writing of data to the HDDA 120. The buffer 104 receives data corresponding to the write commands via the HDC module 108. The disk formatter module 144 receives the data from the buffer 104 via the HDC module 108. The disk formatter module 144 formats the data for writing to the HDDA 120. For example, the disk formatter module 144 adds error correction codes to the data, monitors a position of the read/write elements, and writes the data to the read/write elements as described in FIG. 2.

FIG. 4A illustrates a frame 150 of information prior to being processed by the FIFO management module 300. The frame 150 includes data words 160-1, 160-2, 160-3, ..., and 160-$n$, referred to collectively as data words 160. Conventional FIFO staging memories temporarily store the frame 150 in memory as depicted in FIG. 4A.

Referring now to FIG. 4B, a frame 200 is described in more detail. The frame 200 depicts a frame of data that has been processed by the FIFO management module 300. Typically, the frame 200 includes 1024 bytes of data. However, it is anticipated that the frame 200 can be of variable size. The frame 200 includes tags 210-1, 210-2, 210-3, ..., 210-($n$-1), and 210-$n$, referred to collectively as tags 210, a start of frame (SOF) delimiter 212, data 214, and an end of frame (EOF) delimiter 216. In the present implementation, delimiters represent non-data frame boundary indicators.

Tags 210 denote the identity of a word of information (e.g. an SOF delimiter 212, EOF delimiter 216, and/or data words 214-2, 214-3, ..., and 214-($n$-1), referred to collectively as data words 214) transferred from the host 116. Each of the tags 210 are generated from information supplied by a preliminary tag. The preliminary tag will be discussed in further detail below. Each word of information contained with the frame 200 is identified by a corresponding tag 210.

In various embodiments, the data word 214 can include 64 bits and the tags 210 can include 4 bits. Those skilled in the art can appreciate that data words 214 and tags 210 are not limited to any particular size. The SOF delimiter 212 indicates the type of data 214 that is being stored. Types of data can include, but are not limited to, user data, command data, and/or link data. In an exemplary embodiment, the SOF delimiter 212 is comprised of 64 bits.

The data words 214 include information transferred from the host 116. In other words, the data words 214 are data that will be stored on the buffer 104 or transferred to the platters 122 as shown in FIG. 2. As discussed above, the data word 214 can constitute various types of information. An EOF delimiter 216 follows the last data word 214-($n$-1) in the frame 200. The EOF delimiter 216 is generally 64 bits long and includes a frame cyclic redundancy code check (CRC)

218. Generally, the frame CRC 218 occupies 32 bits of the EOF delimiter 216. Another 32 bits of the EOF delimiter 216 typically provide information such as, but not limited to, the number of sectors (not shown) contained within the frame 200, whether the frame 200 is the last frame of the current data transfer, presence of errors within the frame 200, and/or the validity of the last data word 214-($n$–1).

Information transferred from the host 116 is generally in a frame format. However, as stated above, data is stored on the platters 122 in sectors. Sector size (e.g. 512 bytes) may be different from frame 200 size (e.g. 1024 bytes). Although the sizing of frames is independent of the sizing of sectors and may be programmable, generally a frame of information preferably constitutes two sectors. It is noteworthy that other frame-to-sector ratios are anticipated, and the present invention is not limited to this exemplary embodiment.

The EOF delimiter 216 includes verification information of the last data word 214-($n$–1) of the frame 200 input to a FIFO memory. Generally, at the completion of a transfer of the frame 200, the last data word 214-($n$–1) may not include 64 bits of information, resulting in the most significant bits of the last data word 214-($n$–1) remaining unused. Though it is not necessary to transmit 64 bits of data to the FIFO memory, inclusion of the absent bits of the last data word 214-($n$–1) could lead to corruption of the data temporarily stored in the FIFO memory.

Additionally, errors (e.g. data corruption) may exist within the frame 200, complicating processing that is performed after the frame 200 is read out of the FIFO memory. In the present implementation, the EOF delimiter 216 may include data (such as logic marks) that indicates whether the most significant 32 bits of the last data word 214-($n$–1) that the FIFO memory received are valid and/or that indicates other issues that are present within the frame 200 and have compromised the integrity of the information, making the frame 200 unacceptable.

Figure 5:
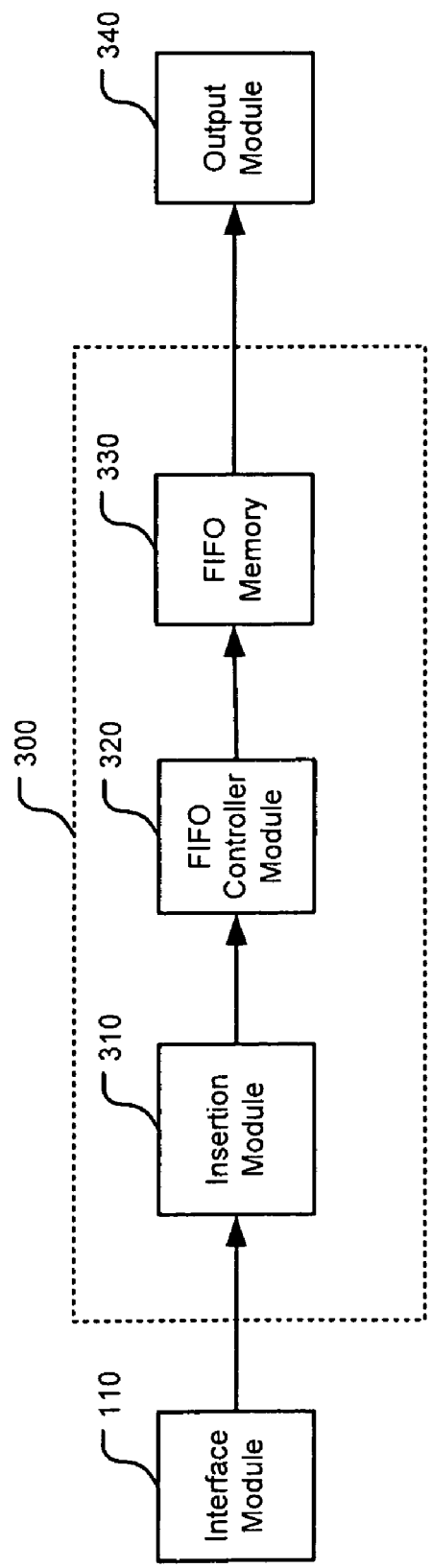
FIG. 5 is a functional block diagram of a FIFO management module according to the present invention.

Referring now to FIG. 5 the FIFO management module 300 is shown in more detail. The FIFO management module 300 includes an insertion module 310, a FIFO controller module 320, and a FIFO memory 330. The insertion module 310 communicates with the host 116 and the FIFO controller module 320. As noted previously, with reference to FIG. 3, the host 116 communicates information to the FIFO management module 300. More specifically, the host 116 communicates information to the insertion module 310 via the interface module 110. The host 116 provides information such as the type of data contained in a frame, presence of errors within a frame, location of a word within a frame, and/or whether a word completes a sector. The insertion module 310 generates preliminary tags (not shown) based on input provided by the host 116. The preliminary tags provide information about the incoming data words to the FIFO controller module 320. In the present implementation, the preliminary tag includes 8 bits of information.

The FIFO controller module 320 interfaces with the insertion module 310 and the FIFO memory 330. The FIFO controller module 320 manages the FIFO memory 330 by verifying that the memory capacity of the FIFO memory 330 is being efficiently utilized by the FIFO management module 300. Additionally, the FIFO controller module 320 aligns words of information received from the host 116 and generates the SOF delimiter 212 and the EOF delimiter 216. In the present implementation, the FIFO management module 300 remains in an idle state until firmware of the HDD system 100 further instructs the FIFO management module 300.

Upon detecting a preliminary tag indicating a first data word 214-1 is to be transmitted from the insertion module 310, the FIFO controller module 320 halts the operation of the insertion module 310 and inserts the SOF delimiter 212 prior to storing data to the FIFO memory 330.

The FIFO controller module 320 then directs the insertion module 310 to resume operation, enabling data words 214-2 to 214-($n$–1) to be freely transmitted and stored to the FIFO memory 330. Tags 210 corresponding to each data word 214 are set by the FIFO controller module 320. The FIFO controller module 320 generates the tags 210 based on information provided by the preliminary tags. After detecting a preliminary tag indicating the last data word of the frame 214-($n$–1) has been received from the insertion module 310, the FIFO controller module 320 halts the operation of the insertion module 310 and inserts the EOF delimiter 216.

The FIFO controller module 320 calculates the frame CRC 218 as data 214 is transmitted to the FIFO controller module 320 from the insertion module 310. The insertion module 310 also generates a sector CRC at the end of each sector boundary. The insertion module 310 can include a counter mechanism that inserts the sector CRC upon reaching a predetermined sector size. The sector CRC is generally stored on the platters 122. In the present implementation, the sector CRC is not identified by a tag. It is anticipated that the counter mechanism may be implemented by the same integrated circuit and/or SOC as the insertion module 310 and/or by additional integrated circuit and/or SOC.

The FIFO controller module 320 encodes the frame CRC 218 in the EOF delimiter 216 along with any additional information as described above with reference to FIG. 4B. Subsequently, the FIFO controller module 320 simultaneously stores a word of information as well as a corresponding tag to the FIFO memory 330. When the FIFO controller module 320 detects that the FIFO memory 330 has reached its storage capacity, the FIFO controller module 320 halts the insertion module 310 until adequate storage space is available within the FIFO memory 330.

The FIFO memory 330 interfaces with the FIFO controller module 320 and output module 340. The FIFO memory 330 is a first-in-first-out type memory that stores information that is in transit between the host 116 and the platters 122. A word outputted by the insertion module 310 is stored in the FIFO memory 330 thereafter. In an exemplary embodiment, the size of the FIFO memory 330 has been expanded to accommodate a 68 bit word. In various embodiments, a word of information is input to the FIFO memory 330 every clock cycle of the FIFO management module 300. Data can be input and extracted from the FIFO memory 330 at various times making the input to the FIFO memory 330 independent of the output of the FIFO memory 330.

The frame 200 includes all the necessary information required by the output module 340 to process the frame 200, thereby enabling the FIFO management module 300 to operate more efficiently. As information is extracted from the FIFO memory 330, the output module 340 verifies the frame CRC 218 encapsulated within the EOF delimiter 216. Additionally, the output module 340 first processes the information encoded within the tag 210 associated with each word of information and then removes the tags 210 from the frame 200. The output module 340 compares a generated CRC (not shown) based on the frame 200 to the frame CRC 218 read from the FIFO memory 330. The frame CRC 218 is utilized by the output module 340 to verify the integrity of the FIFO memory 330. Therefore, when a disparity exists between the generated CRC and the frame CRC 218, the output module 340 determines that an error has occurred. Errors may include, but are not limited to, corruption of data upon being output from the FIFO memory 330 or faulty FIFO memory 330. In the present implementation, the frame CRC 218 is not transferred to the platters 122.

The available storage capacity of the FIFO memory 330 in the FIFO management module 300 is equivalent to the size of the FIFO memory 330. In other words, the entire capacity of the FIFO memory 330 is utilized. The FIFO memory 330 increases the throughput of the system by storing a significant amount of information communicated from the host 116.

Figure 6:
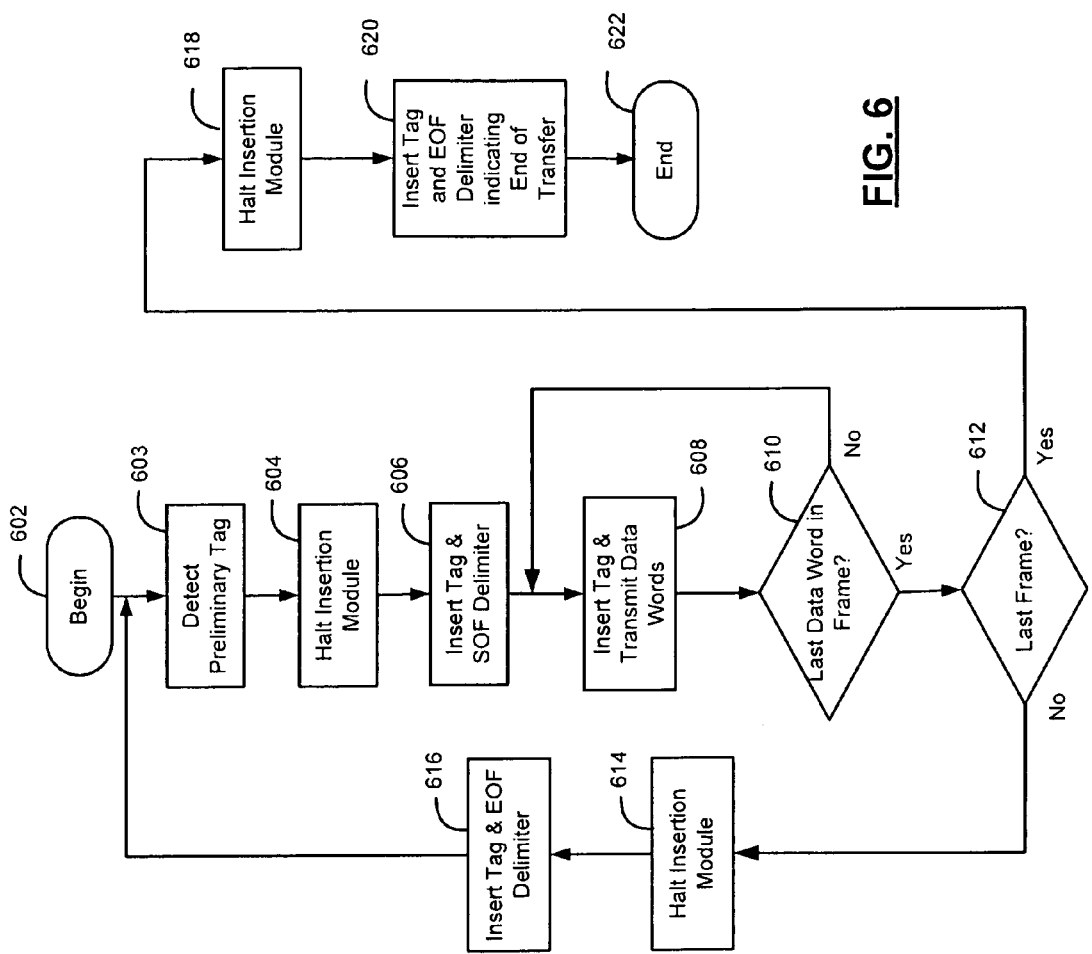
FIG. 6 is a flow diagram for managing memory in a memory storage device according to the present invention.

Referring now to FIG. 6, a method 600 for managing information stored to the FIFO memory 330 is shown in more detail. The method 600 begins in step 602. In step 603, the FIFO controller module 320 detects a preliminary tag that indicates a first data word 214-2. In step 604, the FIFO controller module 320 halts the insertion module 310 from processing information received from the host 116. The FIFO controller module 320 generates and stores the SOF delimiter 212 and the corresponding tag 210-1 in the FIFO memory 330 in step 606.

In step 608, the FIFO controller module 320 directs the insertion module 310 to resume operation, transmits and stores data words 214, and generates and stores corresponding tags 210 to the FIFO memory 330. In the present implementation, the tags 210-2 to 210-($n-1$) corresponding to the data words 214-2 to 214-($n-1$), respectively, are stored in the FIFO memory 330. In step 610, the FIFO controller module 320 determines whether it has received the last data word 214-($n-1$) in the frame 200. If true, the FIFO controller module 320 proceeds to step 612. If false, the FIFO controller module returns to step 608.

In step 612, the FIFO controller module 320 determines whether the last frame of the transmission from the host 116 has been received by the FIFO management module 300. If true, the FIFO controller module 320 proceeds to step 618. If false, the FIFO controller module proceeds to step 614.

In step 614, the FIFO controller module 320 halts the insertion module 310. In step 616, the FIFO controller module 320 generates and stores the EOF delimiter 216 and the corresponding tag 210-$n$ into the FIFO memory 330 and returns to step 603.

In step 618, the FIFO controller module 320 halts the insertion module 310 from continuing further processing of information from the host 116. In step 620, the FIFO controller module 320 stores an EOF delimiter and a corresponding tag. The EOF delimiter indicates that the last frame of the transmission has been received and the current transfer of information from the host 116 is complete.

In step 622, the method 600 ends. In an exemplary embodiment, the FIFO management module 300 remains in an idle state until firmware of the HDD system 100 instructs the FIFO management module 320 to receive additional transmissions.

Figure 7B:
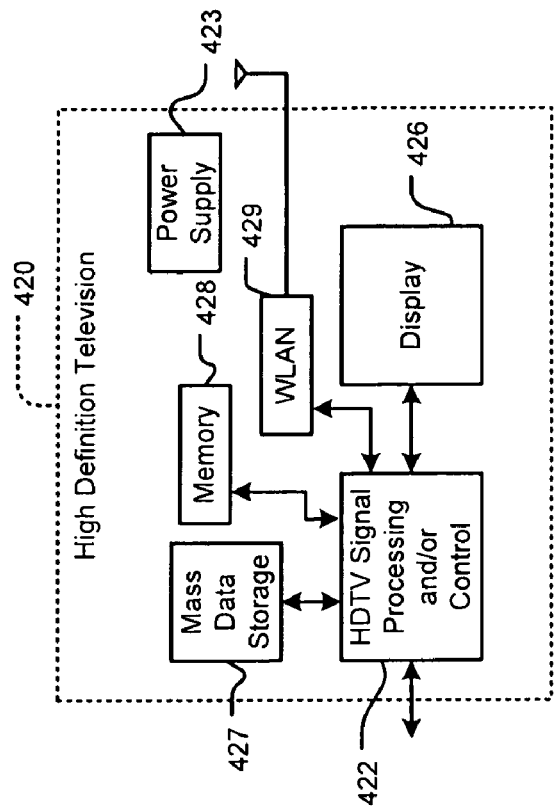
FIG. 7B is a functional block diagram of a high definition television.
Figure 7A:
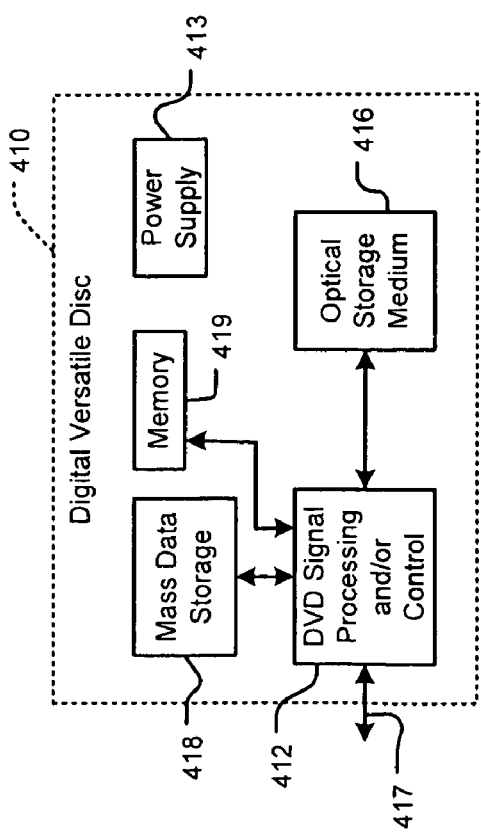
FIG. 7A is a functional block diagram of a digital versatile disk (DVD)

Referring now to FIGS. 7A-7F, various exemplary implementations of the FIFO management system are shown. As shown in FIG. 7A, the FIFO management system 300 can be implemented in a digital versatile disc (DVD) drive 410. The DVD drive 410 includes either or both signal processing and/or control circuits, which are generally identified in FIG. 7A at 412, mass data storage 418 of the DVD drive 410 and/or a power supply 413. The mass data storage 418 of the DVD drive 410 implements the FIFO management system 300. For example, the mass data storage 418 may include one or more buffer memories that temporarily store data that is transmitted to and from the DVD drive 410. The memory controller module (not shown) that manages the buffer memories may implement the FIFO management system 300. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 2. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Referring now to FIG. 7B, the FIFO management system 300 can be implemented in a high definition television (HDTV) 420. The HDTV 420 includes either or both signal processing and/or control circuits, which are generally identified in FIG. 7B at 422, a WLAN interface 429, mass data storage 427 of the HDTV 420 and/or a power supply 423. The mass data storage 427 of the HDTV 420 implements the FIFO management system 300. For example, the mass data storage 427 may include one or more buffer memories that temporarily store data that is transmitted to and from the HDTV 420. The memory controller module (not shown) that manages the buffer memories may implement the FIFO management system 300. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 2 and/or at least one DVD drive may have the configuration shown in FIG. 7A. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via the WLAN interface 429.

Referring now to FIG. 7C, a vehicle 430 includes a powertrain control system 432, a WLAN interface 448, mass data storage 446 and/or a power supply 433. The mass data storage 446 implements the FIFO management system 300. For example, the mass data storage 446 may include one or more buffer memories that temporarily store data that is transmitted to and from the powertrain control system 432. The memory controller module (not shown) that manages the buffer memories may implement the FIFO management system 300. In some implementations, the powertrain control system 432 that receives inputs from one or more sensors 436 such as temperature sensors, pressure sensors, rotational sensors, airflow sensors and/or any other suitable sensors and/or that generates one or more output control signals 438 such as engine operating parameters, transmission operating parameters, and/or other control signals.

The vehicle 430 may also include other control systems 440. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices such as HDDs and/or DVD drives. At least one HDD may have the configuration shown in FIG. 2 and/or at least one DVD drive may have the configuration shown in FIG. 7A. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via the WLAN interface 448. The control system 440 may also include mass data storage, memory and/or a WLAN interface (all not shown).

Referring now to FIG. 7D, the FIFO management system 300 can be implemented in a cellular phone 450 that may include a cellular antenna 451. The cellular phone 450 includes either or both signal processing and/or control circuits, which are generally identified in FIG. 7D at 452, a WLAN interface 468, and mass data storage 464. The mass data storage 464 of the cellular phone 450 implements the FIFO management system 300. For example, the mass data storage 464 may include one or more buffer memories that temporarily store data that is transmitted to and from the cellular phone 450. The memory controller module (not shown) that manages the buffer memories may implement the FIFO management system 300. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices such as HDDs and/or DVD drives. At least one HDD may have the configuration shown in FIG. 2 and/or at least one DVD drive may have the configuration shown in FIG. 7A. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via the WLAN interface 468.

Figure 7F:
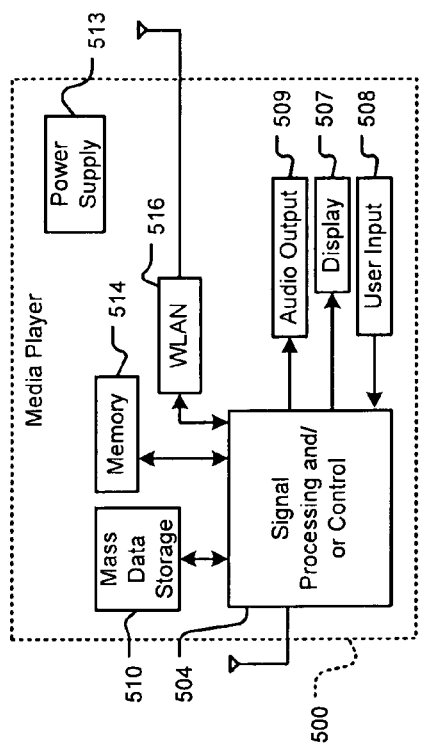
FIG. 7F is a functional block diagram of a media player.
Figure 7E:
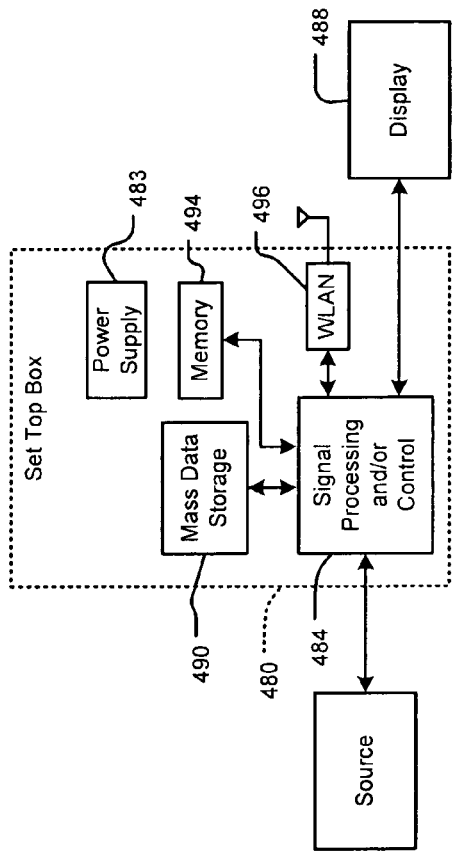
FIG. 7E is a functional block diagram of a set top box.

Referring now to FIG. 7E, the FIFO management system 300 can be implemented in a set top box 480. The set top box 480 includes either or both signal processing and/or control circuits, which are generally identified in FIG. 7E at 484, a WLAN interface 496, mass data storage 490 of the set top box 480 and/or a power supply 483. The mass data storage 490 of the set top box 480 implements the FIFO management system 300. For example, the mass data storage 490 may include one or more buffer memories that temporarily store data that is transmitted to and from the set top box 480. The memory controller module (not shown) that manages the buffer memories may implement the FIFO management system 300. The set top box 480 receives signals from a source such as a broadband source and outputs standard and/or high definition audio/video signals suitable for a display 488 such as a television, a monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as HDDs and/or DVD drives. At least one HDD may have the configuration shown in FIG. 2 and/or at least one DVD drive may have the configuration shown in FIG. 7A. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via the WLAN interface 496.

Referring now to FIG. 7F, the FIFO management system 300 can be implemented in a media player 500. The media player 500 includes either or both signal processing and/or control circuits, which are generally identified in FIG. 7F at 504, a WLAN interface 516, mass data storage 510 of the media player 500 and/or a power supply 513. The mass data storage 510 of the media player 500 implements the FIFO management system 300. For example, the mass data storage 510 may include one or more buffer memories that temporarily store data that is transmitted to and from the media player 500. The memory controller module (not shown) that manages the buffer memories may implement the FIFO management system 300. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage 510 may include optical and/or magnetic storage devices such as HDDs and/or DVD drives. At least one HDD may have the configuration shown in FIG. 2 and/or at least one DVD drive may have the configuration shown in FIG. 7A. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via the WLAN interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A memory management system for a memory in a data storage device, comprising:
   a memory controller module that receives a frame of data including a plurality of data words from a host, that generates boundary indicators based on at least one of a start and an end of said frame and said plurality of data words, and that inserts said boundary indicators into said frame of data; and
   a memory that receives said frame of data and stores said frame of data including said data words and said boundary indicators during transmission between said host and said storage device.

2. The management system of claim 1 wherein said boundary indicators include a first boundary indicator that indicates a type of data of said plurality of data words and said type of data includes at least one of user data, command data, and link data.

3. The management system of claim 2 wherein said boundary indicators include a second boundary indicator that includes at least one of a frame cyclic redundancy code (CRC), a number of sectors included within said frame, and a position of said frame within a plurality of frames of a data transfer.

4. The management system of claim 3 further comprising an insertion module that generates at least one of a plurality of preliminary tags for at least one of each of said plurality of data words and said boundary indicators based on said data words.

5. The management system of claim 4 wherein said preliminary tags indicate at least one of a type of data of said data words, errors within said frame of data, locations for each of said plurality of data words within said frame of data, and completion of a sector.

6. The management system of claim 4 wherein said memory controller module generates a plurality of tags that identify at least one of each of said plurality of data words and said boundary indicators based on said preliminary tags and stores said tags to said memory.

7. The management system of claim 6 wherein said memory controller module detects a first preliminary tag that indicates the start of said frame, halts said insertion module from generating said plurality of preliminary tags when said memory controller module detects said first preliminary tag, stores a first tag that corresponds to said first boundary indicator, and directs said insertion module to resume operation.

8. The management system of claim 7 wherein said memory controller module detects a second preliminary tag that indicates the end of said frame, halts said insertion module when said memory controller module detects said second preliminary tag, stores a second tag that corresponds to said second boundary indicator, and directs said insertion module to resume operation.

9. The management system of claim 6 further comprising an output module that communicates with said memory, that detects said boundary indicators and said tags, that processes said frame of data based on said boundary indicators and said tags, and that transmits the frame of data to a second memory based on at least one of said boundary indicators and said tags.

10. The management system of claim 9 wherein said output module calculates a generated CRC and determines that an error has occurred when said generated CRC differs from said frame CRC.

11. The management system of claim 9 wherein said output module removes said tags from said frame of data.

12. The management system of claim 4 wherein said memory controller module calculates said frame CRC when said plurality of data words are transmitted from said insertion module to said memory controller module.

13. The management system of claim 1 wherein said memory is a first-in-first-out (FIFO) memory.

14. The management system of claim 3 wherein said memory controller module includes a validity indicator in said secondary boundary indicator based on a last data word of said plurality of data words.

15. A hard disk drive (HDD) controller that includes the management system of claim 1.

16. A memory management system for a memory in a data storage device, comprising:
    memory controller means for receiving a frame of data including a plurality of data words from a host, for generating boundary indicators based on at least one of a start and an end of said frame and said plurality of data words, and for inserting said boundary indicators into said frame of data; and
    memory means for receiving said frame of data and storing said frame of data including said data words and said boundary indicators during transmission between said host and said storage device.

17. The management system of claim 16 wherein said boundary indicators include a first boundary indicator that indicates a type of data of said plurality of data words and said type of data includes at least one of user data, command data, and link data.

18. The management system of claim 17 wherein said boundary indicators include a second boundary indicator that includes at least one of a frame cyclic redundancy code (CRC), a number of sectors included within said frame, and a position of said frame within a plurality of frames of a data transfer.

19. The management system of claim 18 further comprising insertion means for generating at least one of a plurality of preliminary tags for at least one of each of said plurality of data words and said boundary indicators based on said data words.

20. The management system of claim 19 wherein said preliminary tags indicate at least one of a type of data of said data words, errors within said frame of data, locations for each of said plurality of data words within said frame of data, and completion of a sector.

21. The management system of claim 19 wherein said memory controller means generates a plurality of tags that identify at least one of each of said plurality of data words and said boundary indicators based on said preliminary tags and stores said tags to said memory means.

22. The management system of claim 21 wherein said memory controller means detects a first preliminary tag that indicates the start of said frame, halts said insertion means from generating said plurality of preliminary tags when said memory controller means detects said first preliminary tag, stores a first tag that corresponds to said first boundary indicator, and directs said insertion means to resume operation.

23. The management system of claim 22 wherein said memory controller means detects a second preliminary tag that indicates the end of said frame, halts said insertion means when said memory controller means detects said second preliminary tag, stores a second tag that corresponds to said second boundary indicator, and directs said insertion means to resume operation.

24. The management system of claim 21 further comprising output means for communicating with said memory means, for detecting said boundary indicators and said tags, for processing said frame of data based on said boundary indicators and said tags, and for transmitting the frame of data to a second memory based on at least one of said boundary indicators and said tags.

25. The management system of claim 24 wherein said output means calculates a generated CRC and determines that an error has occurred when said generated CRC differs from said frame CRC.

26. The management system of claim 24 wherein said output means removes said tags from said frame of data.

27. The management system of claim 19 wherein said memory controller means calculates said frame CRC when said plurality of data words are transmitted from said insertion means to said memory controller means.

28. The management system of claim 16 wherein said memory means is a first-in-first-out (FIFO) memory.

29. The management system of claim 18 wherein said memory controller means includes a validity indicator in said secondary boundary indicator based on a last data word of said plurality of data words.

30. A hard disk drive (HDD) controller that includes the management system of claim 16.

31. A memory management method for a memory in a data storage device, comprising:
  receiving a frame of data including a plurality of data words, from a host, generating boundary indicators based on at least one of a start and an end of said frame and said plurality of data words, and inserting said boundary indicators into said frame of data; and
  receiving said frame of data and storing said frame of data including said data words and said boundary indicators during transmission between said host and said storage device.

32. The method of claim 31 wherein said boundary indicators include a first boundary indicator that indicates a type of data of said plurality of data words and said type of data includes at least one of user data, command data, and link data.

33. The method of claim 32 wherein said boundary indicators include a second boundary indicator that includes at least one of a frame cyclic redundancy code (CRC), a number of sectors included within said frame, and a position of said frame within a plurality of frames of a data transfer.

34. The method of claim 33 further comprising generating at least one of a plurality of preliminary tags for at least one of each of said plurality of data words and said boundary indicators based on said data words.

35. The method of claim 34 wherein said preliminary tags indicate at least one of a type of data of said data words, errors within said frame of data, locations for each of said plurality of data words within said frame of data, and completion of a sector.

36. The method of claim 34 further comprising generating a plurality of tags that identify at least one of each of said plurality of data words and said boundary indicators based on said preliminary tags and storing said tags to the memory.

37. The method of claim 36 further comprising detecting a first preliminary tag that indicates the start of said frame, halting said generation of said plurality of preliminary tags upon detecting said first preliminary tag, storing a first tag that corresponds to said first boundary indicator, and resuming said generation of said plurality of preliminary tags.

38. The method of claim 37 further comprising detecting a second preliminary tag that indicates the end of said frame, halting said generation of said plurality of preliminary tags upon detecting said second preliminary tag, storing a second tag that corresponds to said second boundary indicator, and resuming said generation of said plurality of preliminary tags.

39. The method of claim 36 further comprising communicating with the memory, detecting said boundary indicators and said tags, processing said frame of data based on said boundary indicators and said tags, and transmitting the frame of data to a second memory based on at least one of said boundary indicators and said tags.

40. The method of claim 39 further comprising calculating a generated CRC and determining that an error has occurred when said generated CRC differs from said frame CRC.

41. The method of claim 39 further comprising removing said tags from said frame of data.

42. The method of claim 34 further comprising calculating said frame CRC after said generation of said plurality preliminary tags.

43. The method claim 31 wherein the memory is a first-in-first-out (FIFO) memory.

44. The method of claim 33 wherein said secondary boundary indicator includes a validity indicator based on a last data word of said plurality of data words.

45. A hard disk drive (HDD) controller that includes the method of claim 31.

* * * * *